D. M. CAREY.
CUTTING MECHANISM FOR MOWERS AND HARVESTERS.
APPLICATION FILED AUG. 23, 1919.
1,331,842. Patented Feb. 24, 1920.
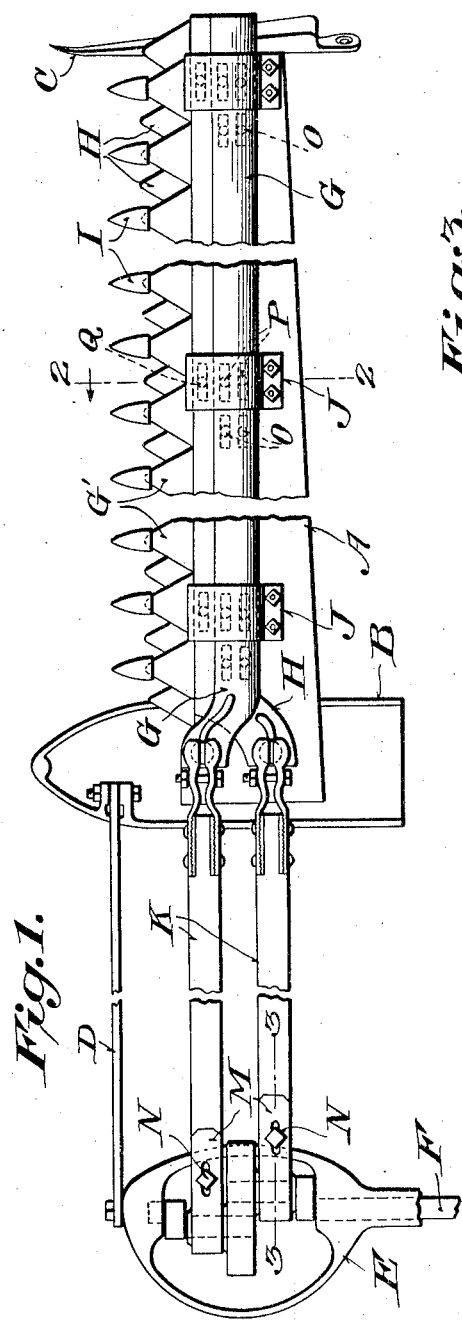
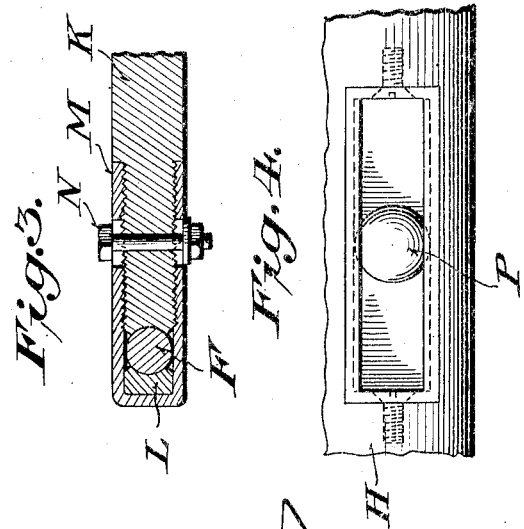
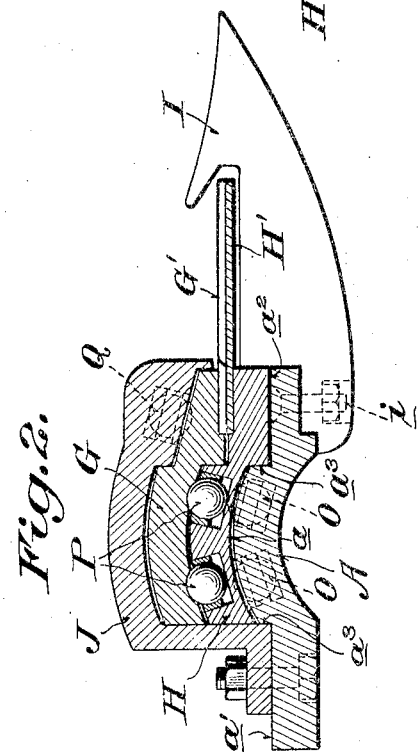
Inventor
Douglas M. Carey
By Meyers Cushman & Rea
Attorneys
Witness
Chas. L. Friesbauer

UNITED STATES PATENT OFFICE.

DOUGLAS M. CAREY, OF ENID, OKLAHOMA.

CUTTING MECHANISM FOR MOWERS AND HARVESTERS.

1,331,842.   Specification of Letters Patent.   Patented Feb. 24, 1920.

Application filed August 23, 1919. Serial No. 319,487.

*To all whom it may concern:*

Be it known that I, DOUGLAS M. CAREY, a citizen of the United States, residing at Enid, in the county of Garfield and State of Oklahoma, have invented new and useful Improvements in Cutting Mechanism for Mowers and Harvesters, of which the following is a specification.

The present invention relates to improvements in the cutting mechanism for mowers and harvesters, and has for its object to provide a mechanism of the character referred to including two cutter bars which are so supported and related that they may be reciprocated with a minimum expenditure of power.

According to the invention, the cutting mechanism is provided with anti-friction bearings which are so related to the other parts that there is no danger of their being lost when the several parts of the mechanism are dismantled. A further object of the invention is to prevent the passage of dirt, etc., into the spaces between the bodies of the cutter bars, and to provide means by which any wear between the pitmen connecting the cranks on the power shaft with the cutter bars may be readily compensated for.

In the accompanying drawings:

Figure 1 is a plan view of a sufficient portion of the cutting mechanism of a mower or harvester to illustrate the invention.

Fig. 2 is a transverse sectional view, on an enlarged scale, substantially on the line 2—2 of Fig. 1.

Fig. 3 is a sectional view, on an enlarged scale, substantially on the line 3—3 of Fig. 1, of the connection between a pitman and its crank.

Fig. 4 is a detail view.

Referring to the drawings, A designates the body of the guard bar of a mower cutting mechanism which, as is customary, is provided with suitable ground shoes or guides B, C, and connected by a link or rod D with a portion of the frame of the machine providing bearings for the power shaft F from which the cutters are actuated.

In the embodiment of the invention illustrated, two cutter bars G, H, are superimposed on each other and on the guard bar A, said bars, as usual, being provided with teeth G', H', that project beyond the forward edge of the guard bar. The bar A is provided with the usual guard fingers I which are secured to the lower surface of the bar by suitable means, as bolts $i$, and to the upper face of said bar are bolted clips J which extend over the cutter bars, and act to prevent movement of said bars away from the guard bar.

Each of the cutter bars is connected to one end of a pitman K, the other end of which is provided with a concave seat forming part of the bearing for one of the cranks on the power shaft F. The other portion L of said bearing comprises a block which is placed within the end of a strap or box M, which is fitted over the end of the pitman and held in position thereon by a bolt N. As shown, the adjacent faces of the pitman and walls of the box M are provided with serrations or interengaging projections and recesses, and the bolt N extends through a short slot formed in the pitman. By this means, the box M may be adjusted slightly relative to the pitman and crank of the power shaft to take up any wear that may occur and thus enable the desired rigid engagement between the crank and the cutter bar to be maintained at all times. As shown also, the connection between the cutter bar and pitman K similarly provides for relative adjustment of these parts. As shown, the connection is effected by straps or plates secured to the cutter bars and provided with serrated surfaces engaging with the corresponding surfaces on the pitmen, suitable bolts being provided for connecting said parts.

As shown, particularly in Fig. 2, the upper face of the guard bar A is provided with an intermediate transversely curved section $a$ which is separated from the substantially horizontal flat surfaces $a'$, $a^2$, that extend along the forward and rear edges of the bar, by relatively vertical shoulders $a^3$.

The upper and lower faces of the lower cutter bar H are shaped to conform to the surfaces $a$, $a^2$, of the guard bar. The lower face of the upper cutter bar is of similar form, and it will be seen that the vertically extending walls separating the forward portions of the cutter bars from the bodies thereof will act to prevent dirt from creeping into the space between the bodies of said bars and interfering with free actuation thereof.

At suitable points anti-friction bearings O are interposed between the guard A and the lower cutter bar and similar bearings P are provided between the two cutter bars. Said anti-friction bearings as shown, each comprise a ball which is permanently fitted within a suitable retainer so that the ball, while free to move longitudinally thereof, cannot fall out, and each of these retainers is secured, as by screw or other means, to one of the bars of the cutting mechanism. Suitable grooves are provided to receive the portions of the ball that project from the retainer and as the latter is relatively permanently connected with the cutter or guard bar, it is evident that such parts will not become separated and liable to be lost when the mechanism is disassembled, for purposes of repair, etc.

Similar anti-friction bearings Q are interposed between the securing clips J and the upper cutter bar so that the two cutter bars may be reciprocated with a minimum amount of power. As shown in Fig. 2, the clips preferably include a rear, vertical, wall, that extends across the rear edges of the cutter bars and the top and forward end of each clip is shaped to correspond with and closely engage the upper surface of the upper cutter bar, and overhang the forward edge thereof.

It is believed that the operation and advantages of the improvements hereinbefore described will be readily understood and appreciated from the foregoing description.

In constructing a cutting mechanism according to the present invention, it is possible to employ shorter cranks on the power shaft than when a single cutter bar is employed, and thus bring the connection between the bar and shaft nearer to the axis of the shaft.

For example, with a single bar cutting mechanism in which the base of each cutting tooth is approximately three inches in length, it has been customary to employ a one and one half inch crank on the power shaft, so that the total movement of the cutter bar at each rotation of the shaft would be three inches.

By my invention, while employing teeth of standard size, three inches at the base, I only use three quarter inch cranks on the shaft.

This enables me to effect the cutting more quickly and with the expenditure of less power than would be the case if the ordinary crank were merely duplicated.

Having thus described my invention, what I claim is:

1. In a cutting mechanism for mowers and harvesters, the combination of a cutter guard bar having a portion of its upper face of convex form in cross section, a cutter bar having a portion of its lower surface adapted to conform to the curved section of the guard bar, means for holding the cutter bar against vertical displacement on the guard bar, and means for reciprocating the cutter bar.

2. In a cutting mechanism for mowers and harvesters, the combination of a cutter guard bar having substantially horizontal upper face sections, extending along its front and rear edges, and an intermediate upwardly projecting transversely curved section separated from said substantially horizontal sections by shoulders, a cutter having its lower face shaped to conform to the curved section of the guard bar and one of said shoulders, clips attached to the guard bar and extending over the cutter bar to limit vertical separation of said members, and means for reciprocating the cutter bar.

3. In a cutting mechanism for mowers and harvesters, the combination of a cutter guard bar having substantially horizontal upper face sections, extending along its front and rear edges, and an intermediate upwardly projecting transversely curved section separated from said substantially horizontal sections by shoulders, a cutter having its lower face shaped to conform to the curved section of the guard bar and one of said shoulders, clips attached to the guard bar and extending over the cutter bar to limit vertical separation of said members, anti-friction bearings interposed between the guard and cutter bars and between the latter and said clips, and means for reciprocating the cutter bar.

4. In a cutting mechanism for mowers and harvesters, the combination of a guard bar, two cutter bars superimposed on each other and on the guard bar, the meeting surfaces of said bars including corresponding flat and curved sections separated by substantially vertical shoulders, means for holding the cutter bars against movement away from the guard bar, and means for simultaneously reciprocating the cutter bars in opposite directions.

5. In a cutting mechanism for mowers and harvesters, the combination of a guard bar, two cutter bars superimposed on each other and on the guard bar, clips attached to the guard bar and extending over the cutter bars to hold them in proper position on the guard bar, anti-friction bearings arranged between the cutter bars and between said bars and the guard bar and clips, each of said bearings being connected with one of said parts to be bodily removable therewith, and means for reciprocating the cutter bars.

6. In a cutting mechanism for mowers and harvesters, the combination of a guard bar, a cutter bar supported on the guard bar, anti-friction bearings between said bars comprising a ball or roller and a keeper or retainer therefor which is relatively permanently connected to one of said bars, means for preventing vertical separation of said bars, and means for reciprocating the cutter bar.

7. In a cutting mechanism for mowers and harvesters, the combination with a guard bar, two cutter bars superimposed on each other and on the guard bar, and each provided with a series of teeth, and a power shaft provided with two diametrically oppositely arranged cranks connected respectively to said cutter bars, the length of each of said cranks being approximately one fourth the maximum width of each tooth of the cutter bar.

In testimony whereof I have hereunto set my hand.

DOUGLAS M. CAREY.